US005900803A

United States Patent [19]

Politz et al.

[11] Patent Number: 5,900,803

[45] Date of Patent: May 4, 1999

[54] DATA COMMUNICATION DEVICE FOR A VEHICLE TOWED BY A MOTOR VEHICLE

[75] Inventors: Werner Politz, Weissach; Wilhelm Grabow, Hildesheim; Wolfgang Steiger, Stuttgart; Rainer Schmedding, Diekholzen, all of Germany

[73] Assignee: Robert Bosch GmbH, Stuttgart, Germany

[21] Appl. No.: 08/861,100

[22] Filed: May 21, 1997

[30] Foreign Application Priority Data

May 22, 1996 [DE] Germany .......................... 196 20 555

[51] Int. Cl.[6] ...................................................... B60Q 1/00

[52] U.S. Cl. ....................... 340/425.5; 340/441; 340/445; 340/825.54; 340/825.72

[58] Field of Search ................................ 340/425.5, 441, 340/445, 825.54, 825.69, 825.72; 364/551.01; 701/2, 29, 30–33, 35

[56] References Cited

U.S. PATENT DOCUMENTS

| | | | |
|---|---|---|---|
| 3,754,122 | 8/1973 | Dinapoli et al. | 340/445 |
| 4,398,172 | 8/1983 | Carroll et al. | 340/445 |
| 4,500,881 | 2/1985 | Beane | 340/445 |
| 4,697,278 | 9/1987 | Fleischer | 364/424 |
| 5,058,044 | 10/1991 | Stewart et al. | 364/551.01 |
| 5,500,637 | 3/1996 | Kokubu | 340/445 |
| 5,673,018 | 9/1997 | Lowe et al. | 340/445 |

FOREIGN PATENT DOCUMENTS

4213880 A1 4/1993 Germany .

*Primary Examiner*—Nina Tong
*Attorney, Agent, or Firm*—Michael J. Striker

[57] ABSTRACT

The data communication device is designed for a towed vehicle having wheels rear lights, brake lights, turn signal lights and an anti-lock braking system, that is drawn by a motor vehicle. This data communication device includes an electrical cable connection (19) for supplying electrical power from the towing vehicle to the rear, brake and turn signal lights; an electrical pulse generator and electrical power supply circuit (14) for producing direct current from wheel motion of the towed vehicle; a rechargeable battery (15) to provide a supplementary direct current in addition to this direct current, when necessary; a controller (10) for the anti-lock braking system including a data producing unit (7) for producing data including mileage covered by the towed vehicle and a wireless transponder (6) operating the gigahertz range for transmission and reception of data from the data producing unit to and from an external data transmitting and receiving station (1).

13 Claims, 2 Drawing Sheets

DATA COMMUNICATION DEVICE FOR A VEHICLE TOWED BY A MOTOR VEHICLE

BACKGROUND OF THE INVENTION

The present invention relates to a data communication device for a vehicle towed by a motor vehicle, to which electrical energy is transmitted by a cable connection from the motor vehicle. The invention also relates further to a method of using this type of data communication device.

Commercial towed vehicles (including semitrailers) usually obtain their electrical power for signal lamps, lights, electrical control circuits, including an anti-lock braking system (ABS) from the motor vehicles towing them. This has the consequence that the electronic and/or electrical operating units in the towed vehicle or trailer do not function when the connection to the towing vehicle is broken. An anti-lock braking system (ABS) has been prescribed for commercial trailers and semitrailers for some time. In an ABS system wheel sensors detected motion of the wheels and input suitable pulses to a central ABS controller. The operation of the brakes is controlled by pneumatic values so that the locking of the brakes is prevented. A plug of the trailer must be connected to a standard socket of the vehicle for switching of the ABS system, so that the controller obtains electrical power. An error signal is transmitted by the connection, which signals whether the ABS system is error-free or a self-testing device contained in the ABS system detects operating errors. Newly developed anti-lock braking system have an expanded control function, in which additional data such as pneumatic shock absorber data, various error data and electronic mileage meter data can be integrated. Moreover a coating wear monitor for the brakes can be performed and the appropriate data can be stored. The output of this data usually occurs manually using a diagnostic connection and requires a manual documentation or by a connectable moveable terminal to which the data can be transmitted.

There is a considerable need to reliably determine the distance covered by the towed vehicle. The electronic mileage determined by counting wheel pulses from the ABS system fails, when the driver circumvents the operating circuit of the ABS system by manual operations, disconnects the ABS connection and interrupts the current flow from the towing vehicle to the ABS. In this situation, of course, the ABS is no longer operative, but the standard pneumatic operating brakes do continue to operate.

It is known further to equip the trailer with a mechanical mileage meter on the wheel hub. However these devices are prone to interference during rough operation and further are easily manipulated or adjusted.

SUMMARY OF THE INVENTION

It is an object of the present invention to provide a data communication device for a vehicle towed by a motor vehicle to obtain data from the towed vehicle which is largely reliable and which can be transmitted in an easily manageable manner.

According to the invention, the data communication device for a towed vehicle and drawn by a motor vehicle comprises means for supplying electrical power including an electrical cable connection to a towing vehicle pulling the towed vehicle and an electrical power supply circuit; a data producing unit for producing data including mileage covered by the towed vehicle and means for short-range wireless transmission and wireless reception of data from the data producing unit to and from an external data transmitting and receiving station.

The data generation for the towed vehicle occurs autarchically from the towing vehicle by means of the data communication device according to the invention so that a current shut off by interruption of the current flow from the towing vehicle is not possible. The transmission of the data stored in the data generation unit to an external transmitting and receiving station occurs wirelessly by means of the data communication device according to the invention with a short-range wireless transmission and reception means. Because the data communication usually takes place while the towed vehicle passes by an external transmitting and receiving station the transmission and reception means is a transponder in a preferred embodiment so that the data communication is activated by the external transmitting and receiving station.

An essential prerequisite for the data communication device according to the invention is that it have the means to operate with a minimum current consumption so that its own current supply can operate reliably and, for example, cannot lead, among other things, to an empty battery.

In a particularly preferred embodiment of the invention a pulse generator is provided for at least one wheel of the towed vehicle, which produces pulses according to the motion of the wheel, which at least arrive in a current providing device with a rectifier, so that energy for the data producing unit is produced from the pulses advantageously used as measuring pulses. An auxiliary battery for supplementing the supply of current can understandably be provided, when, for example, the electrical energy transmitted by the pulses is too weak or too little during a long trip. A connection to the current supply for the rear lights, brake lights and turn signal can be provided for supplementing the current. This supplementary energy can be advantageously supplied, for example, to a chargeable battery.

The short-range wireless data communication advantageously occurs in the GHz range. This sort of data communication system, which operates with a transponder in the motor vehicle, is known from proposals for traffic control engineering, and, for example, is described in German Patent Application DE 42 13 880 A1.

The data producing unit provided in the data communication device may be a part of a controller for an anti-lock braking system installed in the towed vehicle in a preferred embodiment of the invention. Particularly the pulse generator is advantageously at the same time a sensor of the anti-lock braking system. Since all motions of the wheel can be measured and evaluated from the wheel pulses from the sensors of the anti-lock braking system, these results can be used without more for determination of the mileage covered.

The data generation unit according to the invention can understandably by networked with other data sources or for receiving additional data. This includes all data sources of the known ABS-devices. Additional data include identification data for the towed vehicle and, if necessary, other data which are useable also for control of the travel preventing devices of the towed vehicle in order to allow only an authorized use of the towed vehicle. The travel preventing devices can occur, e.g., by a joint operating control of all brakes, also by the pneumatic valves associated with the ABS system.

The data communication device according to the invention may be used especially advantageously at a rental station for the towed vehicle or trailer, in which an automatic delivery and return control of the towed vehicle can be performed by means of an external transmitting and receiving station. Further it is also possible to use the data of the towed vehicle for control of the rental and/or return control devices.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
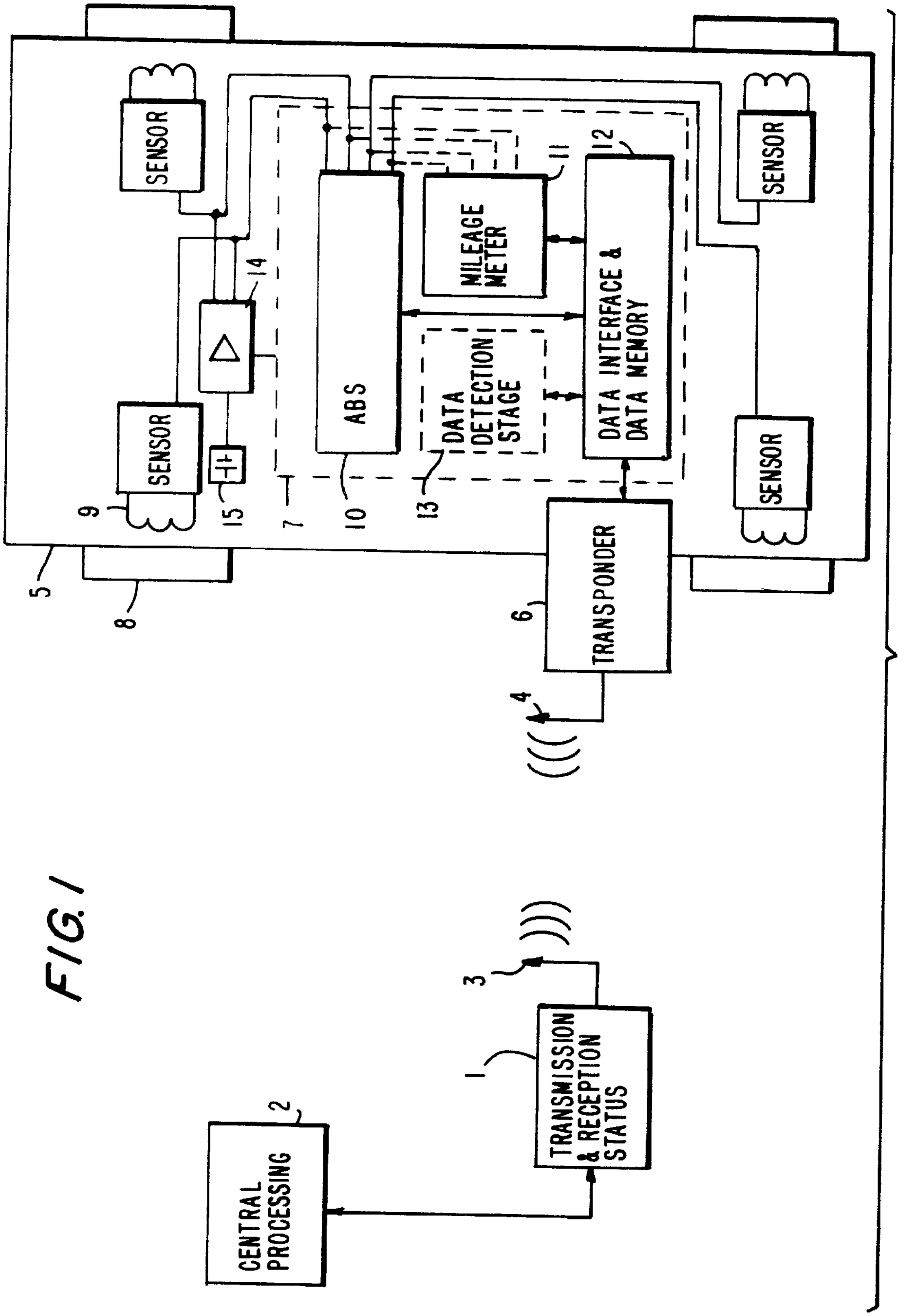
FIG. 1 is a block diagram of a transmitting and receiving station together with a data communication device according to the invention.

A transmitting and receiving station 1 is shown in FIG. 1, which can be connected with a central processing unit 2 and installed in a fixed manner or as part of a fixed installation. The transmitting and receiving station 1 has an antenna 3, which is designed for short-range transmission of data in cooperation with an antenna 4 of a trailer 5, which is a towed vehicle. The antenna 4 of the trailer 5 is part of a transmitting and receiving means 6, which is formed advantageously as a transponder and is designed for communication with the transmitting and receiving station 1 at a frequency of 5.8 GHz. The communication between the transmitting and receiving station 1 and the transmitting and receiving means 6 occurs by sending out a pulse sequence of the transmitting and receiving station 1 (uplink), by modulation of the pulse sequence for transmission of data information by the transponder 6 and by return of the modulated pulsed signal (downlink). The advantage of this communication method, which is described, for example, in German Published Patent Application DE 42 13 880 A1 is that the energy required by the transponder 6 is obtained from the pulsed signal transmitted by the transmitting and receiving station 1.

The data transmitted by the transmitting and receiving means 6 are produced and processed in a data producing unit 7.

In the embodiment shown in the drawing at least one sensor 9 is connected to each of the four wheels 8 of the trailer 5. The output signal from each sensor depends on the motion of the associated wheel 8. Also a pulse generator is shown which produces pulses according to the motion of the wheel 8. The pulses of the sensor 9 arrive at a controller 10, in which the motion of the wheel 8 is analyzed and the ABS control signal produced with which the action of the brakes is controlled.

Also the pulses arriving from the sensors 9 in the controller 10 determine the mileage covered by the trailer 5 from the sensor pulses. The covered mileage signal so formed is fed to the transponder 6 as a processed data signal via a communications interface and a data memory 12.

Also other data, which can be detected in other ways, if necessary by special sensors or by a reader unit provided in the trailer 5, can be transmitted via the communications interface 12. A stage for detection of this other data is shown schematically in the drawing as a data detection stage 13. In this data detection stage 13, for example, data for identifying the particular trailer 5 in which it is located are stored so that the transmitting and receiving station 1 can be used for automatic checking in and checking out in a rental station for trailers 5. The traveling into and traveling out from the rental station can be controlled, for example by a gate, in a suitable way.

In order to guarantee the necessary power for the data producing unit 7 and especially for the mileage meter 11 and for the preparation of the data in the communications interface and the data memory 12, the output pulses of the sensors 9 are also conducted to a power supply unit 14 in which the pulses are rectified and a direct current voltage is formed for supply to the data producing unit 7. A current supply for the mileage meter 11 is only required when the wheels 8 also in fact move.

For clarity only two of the four illustrated sensors 9 are connected with the power supply unit 14. All four sensors 9 are however usually connected to the power supply unit 14.

For the case of a very slow motion of the wheels 8 the direct voltage produced by the current supply or power supply unit 14 is too low to supply the data producing unit 7. In this case the power supply unit 14 can be equipped with an auxiliary battery 15 which takes over in the extreme case of especially slow motion. The auxiliary battery 15 can be formed as a chargeable battery, which always can be charged.

Figure 2:
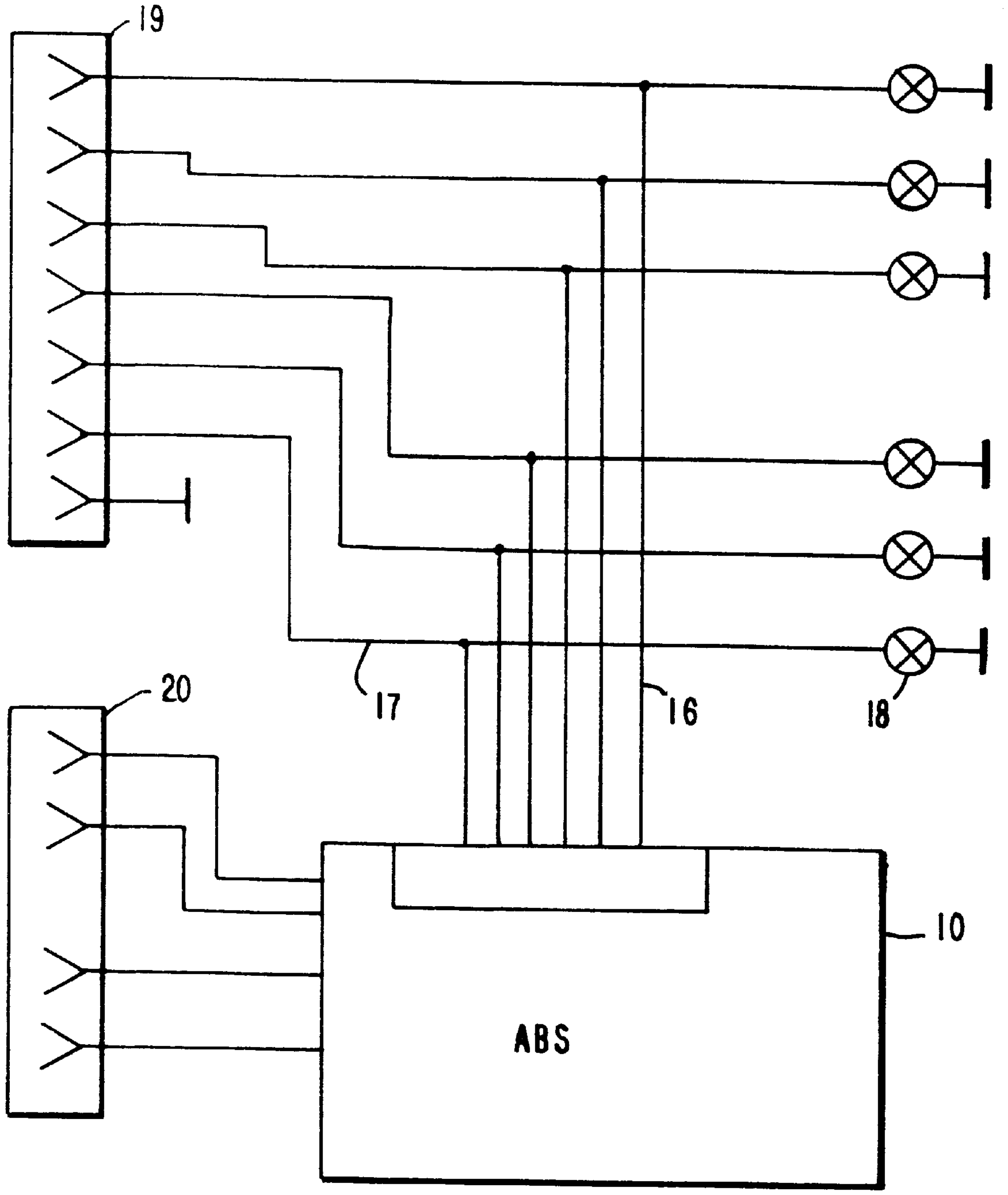
FIG. 2 is a schematic diagram of an auxiliary power supply for the blinker and warning lights of a trailer including the data communication device according to the invention.

FIG. 2 shows a current supply circuit for an ABS controller 10 including the circuit branch lines 16 from the power supply cable 17 for the blinker and warning lights 18 of the trailer 5. The power supply cable 17 is supplied from the towing vehicle via a connector 19 of the trailer 5, which similarly can be made by charging of an auxiliary chargeable battery.

The ABS-controller 10 is connected with the towing vehicle via a plug 20 with the towing vehicle.

The data producing unit 7 and the transmitting and receiving device 6 according to the invention can be operated independently of a power supply of the towing vehicle and are always operable so that a mileage measurement occurs continuously. The data transmitted are stored in the data memory 12 and are continuously retrieved by a transmitting and receiving station 1 in coordination with the transmitting and receiving device 6 on the trailer 5.

For the first time then a completely reliable and continuously controllable measurement of the covered mileage by the trailer 5 should be possible electronically.

The disclosure in German Patent Application 196 20 555.7 of May 22, 1996 is incorporated here by reference. This German Patent Application, at least in part, describes the invention described hereinabove and claimed in the claims appended herein in below and provides the basis for a claim of priority for the instant invention under 35 U.S.C. 119.

While the invention has been illustrated and described as embodied in a data communication device for a towed vehicle, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A data communication device for a towed vehicle having wheels, said data communication device comprising an electrical cable connection (19) for supplying electrical power from a towing vehicle pulling said towed vehicle;

an electrical power supply circuit for supplying a direct current in the towed vehicle, wherein said electrical power supply circuit is located inside said towed vehicle and includes a chargeable battery (15), at least one pulse generator (9) for producing electrical pulses from motion of at least one of said wheels (8) of the towed vehicle and a rectifier for said electrical pulses to thus produce said direct current;

a data producing unit (7) for producing data including mileage covered by said towed vehicle, said data producing unit (7) being connected electrically to the electrical power supply circuit inside the towed vehicle so as to be able to receive said direct current therefrom, said data producing unit including analysis means (11) for processing said pulses from said at least one pulse generator (9) for determination of said mileage covered by said towed vehicle; and means (6) for wireless transmission and wireless reception of said data from said data producing unit (7) to and from an external data transmitting and receiving station (1) located outside said towed vehicle, said means (6) for wireless transmission and wireless reception consisting of a transponder operating in the gigahertz range in said towed vehicle.

2. The data communication device as defined in claim 1, further comprising means for networking of other data sources in said towed vehicle to said data producing unit (7).

3. The data communication device as defined in claim 1, further comprising a switching circuit for preventing further travel of the towed vehicle.

4. The data communication device as defined in claim 1, wherein said towed vehicle has rear lights, brake lights and turn signal lights, and further comprising means for electrically connecting said rear lights, brake lights and turn signal lights to receive said electrical power.

5. A data communication device for a towed vehicle having wheels, an anti-lock braking system for said wheels and a controller for said anti-lock braking system, said data communication device comprising an electrical cable connection (19) for supplying electrical power from a towing vehicle pulling said towed vehicle;

an electrical power supply circuit for supplying a direct current in the towed vehicle, wherein said electrical power supply circuit is located inside said towed vehicle and includes a chargeable battery (15) for supplying a direct current in the towed vehicle, at least one pulse generator (9) for producing electrical pulses from motion of at least one of said wheels (8) of the towed vehicle and a rectifier for said electrical pulses to thus produce said direct current;

a data producing unit (7) for producing data including mileage covered by said towed vehicle, said data producing unit (7) being located in said controller (10) and connected electrically to the electrical power supply circuit inside the towed vehicle so as to be able to receive said direct current therefrom; and means (6) for wireless transmission and wireless reception of said data from said data producing unit (7) to and from an external data transmitting and receiving station (1) located outside said towed vehicle, said means (6) for wireless transmission and wireless reception consisting of a transponder operating in the gigahertz range.

6. The data communication device as defined in claim 5, wherein said at least one pulse generator (9) is connected to said controller (10) of said anti-lock braking system to act as a sensor of said anti-lock braking system.

7. The data communication device as defined in claim 5, further comprising means for networking of other data sources in said towed vehicle to said data producing unit (7).

8. The data communication device as defined in claim 5, further comprising a switching circuit for preventing further travel of the towed vehicle.

9. The data communication device as defined in claim 5, wherein said towed vehicle has rear lights, brake lights and turn signal lights, and further comprising means for electrically connecting said rear lights, brake lights and turn signal lights to receive said electrical power.

10. A method of data communication to and from a towed vehicle having wheels, an anti-lock braking system for said wheels and a controller for said anti-lock braking system, said method comprising the steps of:

a) providing a data communication device comprising an electrical cable connection (19) for supplying electrical power from a towing vehicle pulling said towed vehicle; an electrical power supply circuit located inside said towed vehicle, said electrical power supply circuit including a chargeable battery (15) for supplying a direct current in the towed vehicle, at least one pulse generator (9) for producing electrical pulses from motion of at least one of said wheels (8) of the towed vehicle and a rectifier for said electrical pulses in order to thus produce said direct current, said at least one pulse generator (9) being connected with said controller (10) to act as a sensor for said anti-lock braking system; a data producing unit (7) for producing data including mileage covered by said towed vehicle, said data producing unit (7) being located in said controller (10) and connected electrically to the electrical power supply circuit inside the towed vehicle so as to be able to receive said direct current therefrom; and means (6) for wireless transmission and wireless reception of said data from said data producing unit (7) to and from an external data transmitting and receiving station (1) located outside said towed vehicle, said means (6) for wireless transmission and wireless reception consisting of a transponder operating in the gigahertz range; and b) providing means for output and feedback control of the towed vehicle using said data communication device.

11. A method of data communication to and from a towed vehicle having wheels, an anti-lock braking system for said wheels and a controller for said anti-lock braking system, said method comprising the steps of:

a) providing a data communication device comprising an electrical cable connection (19) for supplying electrical power from a towing vehicle pulling said towed vehicle; an electrical power supply circuit located inside said towed vehicle, said electrical power supply circuit including a chargeable battery (15) for supplying a direct current in the towed vehicle, at least one pulse generator (9) for producing electrical pulses from motion of at least one of said wheels (8) of the towed vehicle and a rectifier for said electrical pulses in order to thus produce said direct current, said at least one pulse generator (9) being connected with said controller (10) to act as a sensor for said anti-lock braking system; a data producing unit (7) for producing data including mileage covered by said towed vehicle, said data producing unit (7) being located in said controller (10) and connected electrically to the electrical power supply circuit inside the towed vehicle so as to be able to receive said direct current therefrom and said data producing unit (7) including analysis means (11) for processing said electrical pulses from said pulse generator (9) for determination of said mileage covered by said towed vehicle; and means (6) for wireless transmission and wireless reception of said data from said data producing unit (7) to and from an external data transmitting and receiving station (1) located outside said towed vehicle, said means (6) for wireless transmission and wireless reception consisting of a transponder operating in the gigahertz range; and b) providing means for controlling towed vehicle rental and return in a rental station using said vehicle communication device.

12. A method of data communication to and from a towed vehicle having wheels, said method comprising the steps of:

a) providing a data communication device comprising an electrical cable connection (19) for supplying electrical power from a towing vehicle pulling said towed vehicle; an electrical power supply circuit for supplying a direct current in the towed vehicle, wherein said electrical power supply circuit is located inside said towed vehicle and includes a chargeable battery (15), at least one pulse generator (9) for producing electrical pulses from motion of at least one of said wheels (8) of the towed vehicle and a rectifier for said electrical pulses to thus produce said direct current; a data producing unit (7) for producing data including mileage covered by said towed vehicle, said data producing unit (7) being connected electrically to the electrical power supply circuit inside the towed vehicle so as to be able to receive said direct current therefrom, said data producing unit including analysis means (11) for processing said pulses from said at least one pulse generator (9) for determination of said mileage covered by said towed vehicle; and means (6) for wireless transmission and wireless reception of said data from said data producing unit (7) to and from an external data transmitting and receiving station (1) located outside said towed vehicles said means (6) for wireless transmission and wireless reception consisting of a transponder operating in the gigahertz range in said towed vehicle; and b) providing means for output and feedback control of the towed vehicle using said data communication device.

13. A method of data communication to and from a towed vehicle having wheels, said method comprising the steps of:

a) providing a data communication device comprising an electrical cable connection (19) for supplying electrical power from a towing vehicle pulling said towed vehicle; an electrical power supply circuit for supplying a direct current in the towed vehicle, wherein said electrical power supply circuit is located inside said towed vehicle and includes a chargeable battery (15), at least one pulse generator (9) for producing electrical pulses from motion of at least one of said wheels (8) of the towed vehicle and a rectifier for said electrical pulses to thus produce said direct current; a data producing unit (7) for producing data including mileage covered by said towed vehicle, said data producing unit (7) being connected electrically to the electrical power supply circuit inside the towed vehicle so as to be able to receive said direct current therefrom, said data producing unit including analysis means (11) for processing said pulses from said at least one pulse generator (9) for determination of said mileage covered by said towed vehicle; and means (6) for wireless transmission and wireless reception of said data from said data producing unit (7) to and from an external data transmitting and receiving station (1) located outside said towed vehicle, said means (6) for wireless transmission and wireless reception consisting of a transponder operating in the gigahertz range in said towed vehicle; and b) providing means for controlling towed vehicle rental and return in a rental station using said vehicle communication device.

* * * * *